United States Patent [19]

Ishikawa

[11] Patent Number: 5,065,422
[45] Date of Patent: Nov. 12, 1991

[54] SUBSCRIBER CALL SIMULATOR CAPABLE OF TESTING NEW SERVICES OF A TELEPHONE SWITCHING SYSTEM

[75] Inventor: Mitsuru Ishikawa, Tokyo, Japan
[73] Assignee: NEC Corporation, Tokyo, Japan
[21] Appl. No.: 624,863
[22] Filed: Dec. 10, 1990

[30] Foreign Application Priority Data

Dec. 8, 1989 [JP] Japan .................................. 1-319898
Feb. 27, 1990 [JP] Japan .................................... 2-47701

[51] Int. Cl.[5] ........................ H04M 3/24; H04M 3/30
[52] U.S. Cl. ....................................... 379/11; 379/16; 379/18
[58] Field of Search ..................... 379/9, 10, 11, 16, 18

[56] References Cited

U.S. PATENT DOCUMENTS 4,021,624 5/1977 Kelly et al. ............................ 379/18
4,937,850 6/1990 Borbas et al. ......................... 379/18

Primary Examiner—Stafford D. Schreyer
Attorney, Agent, or Firm—Sughrue, Mion, Zinn, Macpeak & Seas

[57] ABSTRACT

Connected to a telephone switching system through subscriber lines, a subscriber call simulator acts as a plurality of pseudo-subscriber's telephone sets. An input/output section inputs control procedure information for the pseudo-subscriber's telephone sets. Connected to the input/output section, a memorizing arrangement memorizes the control procedure information as stored information. By using the stored information, a control circuit controls the pseudo-subscriber's telephone sets. The control procedure information comprises a control procedure program and correspondence information stored in a procedure program memory and a correspondence information memory, respectively, both of which act as the memorizing arrangement.

3 Claims, 5 Drawing Sheets

SUBSCRIBER CALL SIMULATOR CAPABLE OF TESTING NEW SERVICES OF A TELEPHONE SWITCHING SYSTEM

BACKGROUND OF THE INVENTION

This invention relates to a subscriber call simulator for use in testing a telephone switching system.

In prior art, a telephone switching system only carries out a connecting service which connects a subscriber's telephone set of an originator with another subscriber's telephone set of a receiver which the originator dials. Such a connecting service is called a basic service. In order to test the basic service of the telephone switching system, use is made of a subscriber call simulator which makes the telephone switching system repeatedly carry out the basic service. In other words, the subscriber call simulator repeatedly carries out a basic operation which comprises call, dial number transmission, answer, speech confirmation, and disconnection, in the manner which will later be described in more detail. The subscriber call simulator is connected through subscriber lines to the telephone switching system. The subscriber call simulator acts as pseudo-subscriber's telephone sets. At any rate, a conventional subscriber call simulator only carries out the basic operation.

With an appearance of an electronic switching system of a stored program control type, it has become possible to provide various new services, such as a call forwarding service, a three-way calling service, and so on in addition to the basic service. The conventional subscriber call simulator is disadvantageous in that it is impossible to carry out the test of the such new services. As a result, the subscriber's telephone sets must be directly put into operation on manually carrying out each new service by one who tests the new service. Inasmuch as each of those tests is a manual test, it takes a long time and a lot of man-hours to test the new services. On simultaneously carrying out the new services, the subscriber lines must be used without overlap. When the conventional subscriber call simulator is connected to another telephone switching system, reset must be made as regards all information indicative of, for example, dial numbers. Such a manual test is not efficient and can not shorten a test time interval.

SUMMARY OF THE INVENTION

It is an object of this invention to provide a subscriber call simulator which is capable of making a telephone switching system repeatedly carry out not only a basic service but also various new services.

It is another object of this invention to provide a subscriber call simulator of the type described, which is capable of automatically testing the various new services.

It is still another object of this invention to provide a subscriber call simulator of the type described, which can shorten a test time interval.

Other objects of this invention will become clear as the description proceeds.

On describing the gist of an aspect of this invention, it is possible to understand that a subscriber call simulator is connected through subscriber lines to a telephone switching system. The subscriber call simulator acts as pseudo-subscriber's telephone sets.

According to this invention, the above-understood subscriber call simulator comprises inputting means for inputting control procedure information for the pseudo-subscriber's telephone sets, memorizing means connected to the inputting means for memorizing the control procedure information as stored information, and controlling means connected to the memorizing means and the pseudo-subscriber's telephone sets for controlling the pseudo-subscriber's telephone sets by using the stored information.

On describing the gist of another aspect of this invention, it is possible to understand that a subscriber call simulator is connected to a telephone switching system through subscriber lines assigned with line numbers. The subscriber call simulator acts as pseudo-subscriber's telephone sets assigned with telephone numbers.

According to this invention, the last-understood subscriber call simulator comprises inputting means for inputting a control procedure program for the pseudo-subscriber's telephone sets and correspondence information which makes the pseudo-subscriber's telephone sets correspond to the line numbers and the telephone numbers, procedure program memorizing means connected to the inputting means for memorizing the control procedure program, correspondence information memorizing means connected to the inputting means for memorizing the correspondence information, and controlling means connected to the procedure program memorizing means, to the correspondence information memorizing means, and to the pseudo-subscriber's telephone sets for controlling the pseudo-subscriber's telephone sets by using the control procedure program and the correspondence information stored in the procedure program memorizing means and the correspondence information memorizing means.

BRIEF DESCRIPTION OF THE DRAWING:

FIG. 6 is another example of correspondence information stored in the correspondence information memory for use in the subscriber call simulator illustrated in FIG. 2.

DESCRIPTION OF THE PREFERRED EMBODIMENTS

Figure 1:
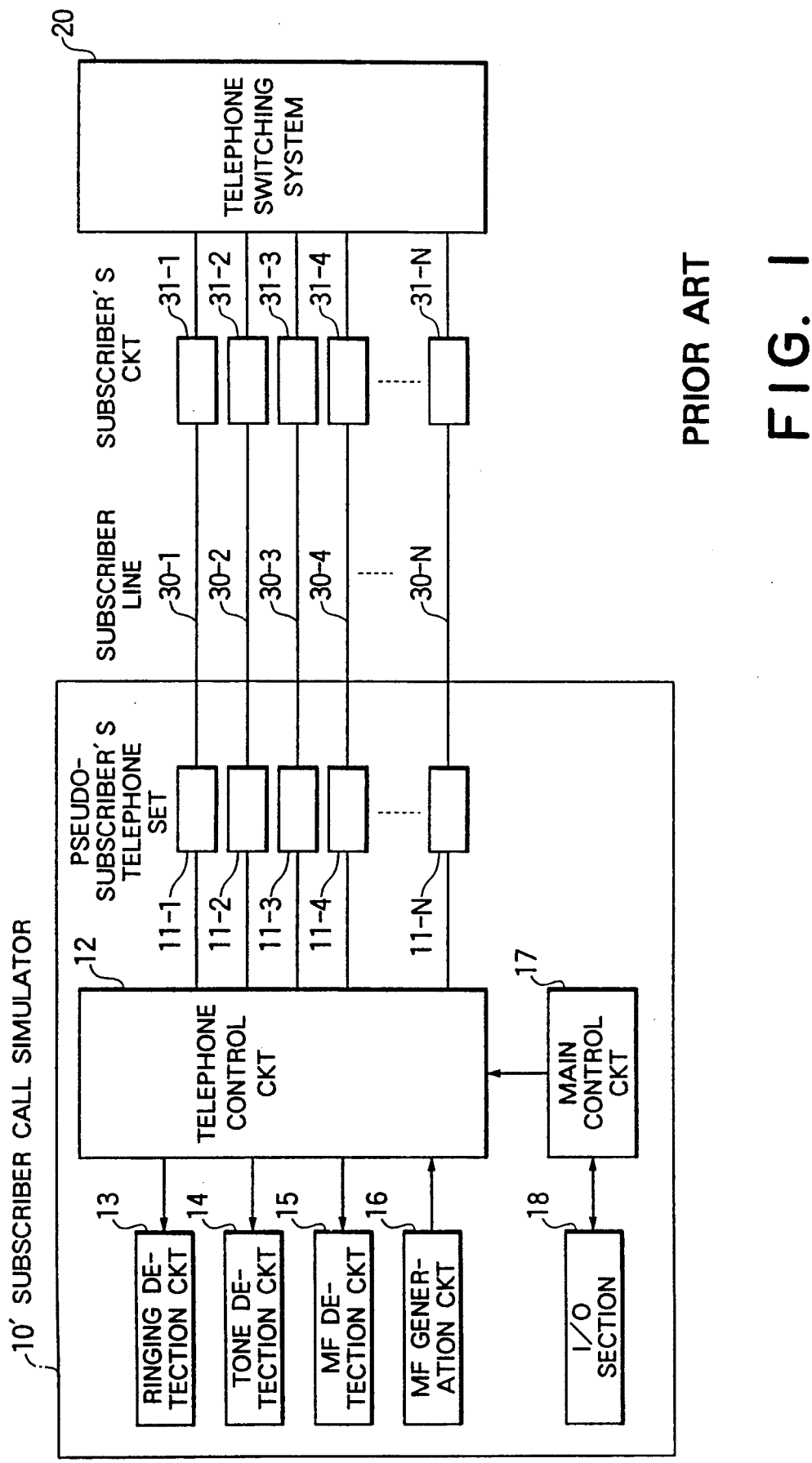
FIG. 1 shows in blocks a conventional subscriber call simulator together with a telephone switching system.

Referring to FIG. 1, description will be made at first in order to facilitate an understanding of this invention as regards a conventional subscriber call simulator 10' for use in combination with a telephone switching system 20.

As shown in FIG. 1, the conventional subscriber call simulator 10' is connected to the telephone switching system 20 through first through N-th subscriber lines 30-1, 30-2, 30-3, 30-4, . . . , and 30-N and first through N-th subscriber's circuits 31-1, 31-2, 31-3, 31-4, ..., and 31-N where N represents a predetermined number which is not less than three.

The conventional subscriber call simulator 10' comprises first through N-th pseudo-subscriber's telephone sets 11-1, 11-2, 11-3, 11-4, ..., and 11-N which are connected to the first through the N-th subscriber lines 30-1 to 30-N, respectively. The first through the N-th pseudo-subscriber's telephone sets 11-1 to 11-N are connected to a telephone control circuit 12 in common. The telephone control circuit 12 is connected to a ringing detection circuit 13, a tone detection circuit 14, a multifrequency (MF) signal detection circuit 15, and a multifrequency signal generation circuit 16. The telephone control circuit 12 is controlled by a main control circuit 17 which is connected to an input/output (I/O) section 18.

Description will be made below as regards an operation of the conventional subscriber call simulator 10' assuming without loss of generality that the first pseudo-subscriber's telephone set 11-1 calls the second pseudo-subscriber's telephone set 11-2.

The main control circuit 17 receives a telephone number of the second pseudo-subscriber's telephone set 11-2 from the input/output section 18. On receiving a start indication from the input/output section 18, the main control circuit 17 controls the telephone control circuit 12 to put the first pseudo-subscriber's telephone set 11-1 in an off-hook condition. When the tone detection circuit 14 detects a dial tone, the telephone control circuit 12 controls the first pseudo-subscriber's telephone set 11-1 to make the first pseudo-subscriber's telephone set 11-1 send through the first subscriber line 30-1 and the first subscriber's circuit 31-1 to the telephone switching system 20 the telephone number of the second pseudo-subscriber's telephone set 11-2 that is supplied from the multifrequency signal generation circuit 16.

On receiving the telephone number of the second pseudo-subscriber's telephone set 11-2, the telephone switching system 20 sends a ringing signal to the second pseudo-subscriber's telephone set 11-2 through the second subscriber's circuit 31-2 and the second subscriber line 30-2.

When the ringing detection circuit 13 detects the ringing signal for the second pseudo-subscriber's telephone set 11-2, the telephone control circuit 12 controls the second pseudo-subscriber's telephone set j 11-2 to put the second pseudo-subscriber's telephone set 11-2 in an off-hook condition.

In order to confirm a speech path between the first and the second pseudo-subscriber's telephone sets 11-1 and 11-2, the main control circuit 17 controls the telephone control circuit 12 by using the multifrequency signal detection circuit 15 and the multifrequency signal generation circuit 16 as follows. The second pseudo-subscriber's telephone set 11-2 sends a tracer tone to the first pseudo-subscriber's telephone set 11-1 by using the multifrequency signal generation circuit 16. The first pseudo-subscriber's telephone set 11-1 detects the tracer tone by using the multifrequency signal detection circuit 15. Subsequently, the first pseudo-subscriber's telephone set 11-1 sends the tracer tone to the second pseudo-subscriber's telephone set 11-2 by using the multifrequency signal generation circuit 16. The second pseudo-subscriber's telephone set 11-2 detects the tracer tone by using the multifrequency signal detection circuit 15.

If the tracer tone is detected in both directions, the telephone switching system 20 normally carries out a switching connection processing for this call. Under the circumstances, the main control circuit 17 increments the number of completed calls by one.

If the dial tone is not detected when five seconds lapse from a time instant at which the first pseudo-subscriber's telephone set 11-1 is put in the off-hook condition, the main control circuit 17 increments the number of incompleted calls by one.

The main control circuit 17 supplies the number of the completed calls, the number of the incompleted calls, and the cause of the incompleted calls to the input/output section 18.

Therefore, the conventional subscriber call simulator 10' has disadvantages, as pointed out in the preamble of the instant specification.

Figure 2:
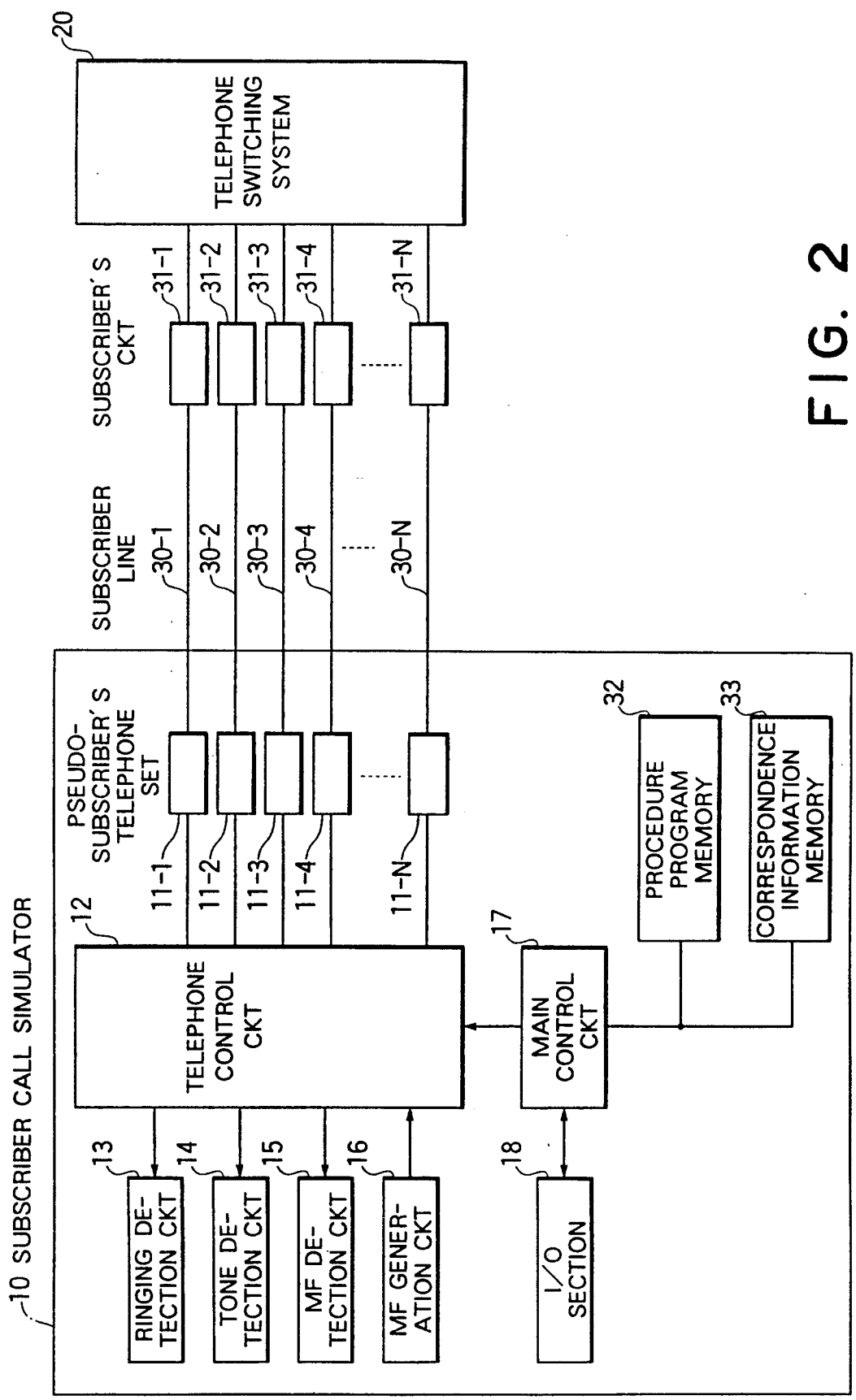
FIG. 2 shows in blocks a subscriber call simulator according to an embodiment of this invention together with the telephone switching system.

Referring to FIG. 2, a subscriber call simulator 10 according to an embodiment of this invention is for use in combination with the telephone switching system 20, like in FIG. 1.

In FIG. 2, the subscriber call simulator 10 is for connection to the telephone switching system 20 and comprises similar parts which are designated by like reference numerals and are operable as in the conventional subscriber call simulator 10' illustrated in FIG. 1. It should be noted that the subscriber call simulator 10 further comprises a procedure program memory 32 and a correspondence information memory 33 which are connected to the input/output section 18 through the main control circuit 17.

The first through the N-th subscriber lines 30-1 to 30-N are assigned with first through N-th line numbers, respectively. In the example being illustrated, the first through the N-th line numbers are equal to 0 through (N−1), respectively. The first through the N-th pseudo-subscriber's telephone sets 11-1 to 11-N are assigned with first through N-th telephone numbers, respectively.

The input/output section 18 acts as an inputting arrangement for inputting control procedure programs for the first through the N-th pseudo-subscriber's telephone sets 11-1 to 11-N and correspondence information. The correspondence information makes the first through the N-th pseudo-subscriber's telephone sets 11-1 to 11-N correspond to the first through the N-th line numbers and the first through the N-th line numbers. The control procedure programs and the correspondence information are supplied to the main control circuit 17.

Supplied with the control procedure programs and the correspondence information, the main control circuit 17 stores the control procedure programs and the correspondence information in the procedure program memory 32 and the correspondence information memory 33, respectively. In other words, the procedure program memory 32 and the correspondence information memory 33 are for memorizing the control procedure programs and the correspondence information, respectively.

A combination of the control procedure programs and the correspondence information is referred to control procedure information. Therefore, a combination of the procedure program memory 32 and the correspondence information memory 33 serves as a memorizing arrangement for memorizing the control procedure information as stored information.

The main control circuit 17 reads the control procedure programs and the correspondence information from the procedure program memory 32 and the correspondence information memory 33 and then controls the first through the N-th pseudo-subscriber's telephone sets 11-1 to 11-N through the telephone control circuit 12 by using the control procedure programs and the correspondence information in the manner which will later becomes clear. At any rate, a combination of the main control circuit 17 and the telephone control circuit 12 serves as a controlling arrangement for controlling the first through the N-th pseudo-subscriber's telephone sets 11-1 to 11-N by using the control procedure programs and the correspondence information.

Figures 3, 4:
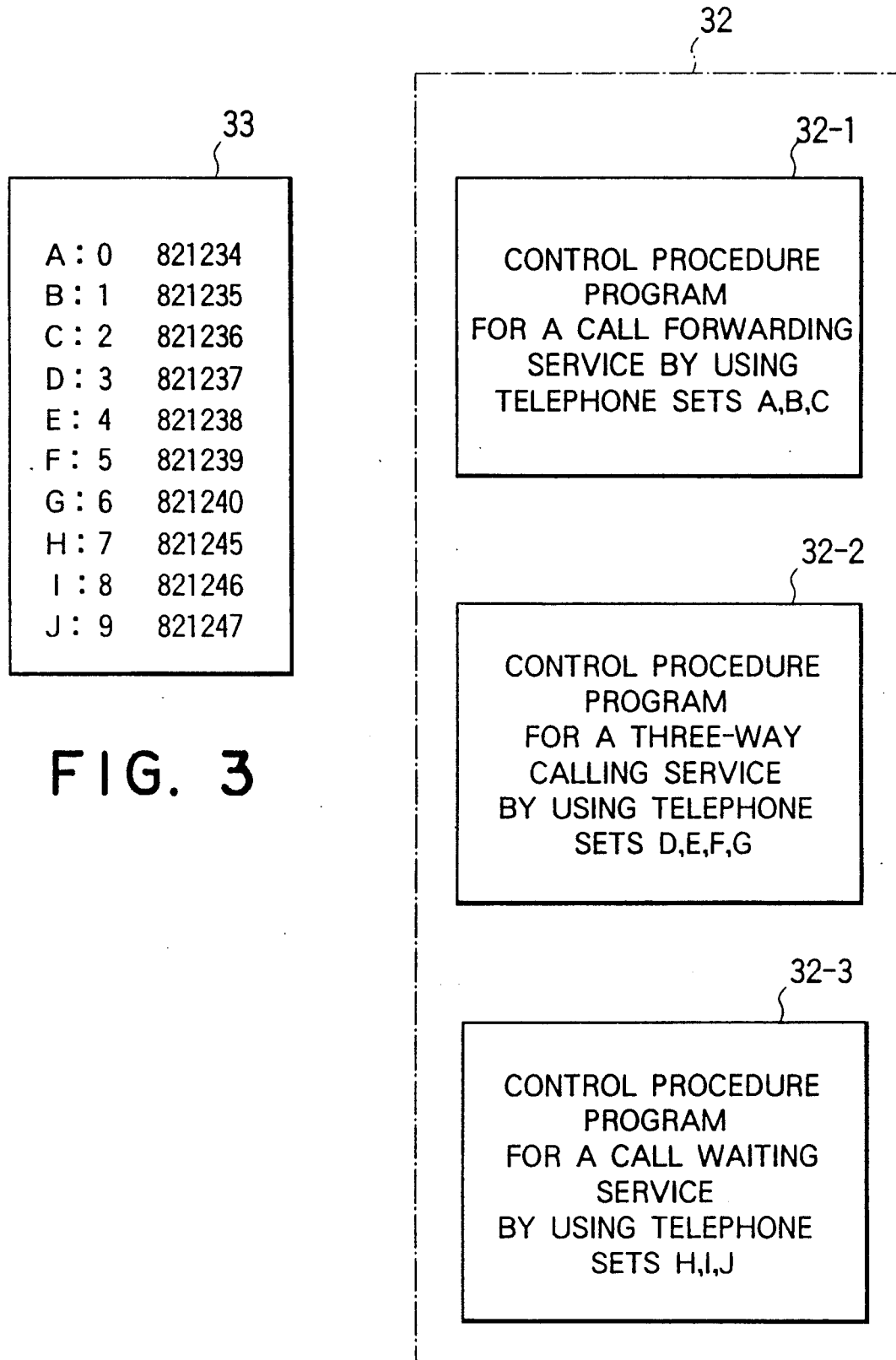
FIG. 3 is an example of correspondence information stored in a correspondence information memory for use in the subscriber call simulator illustrated in FIG. 2.
FIG. 4 is control procedure programs stored in a procedure program memory for use in the subscriber call simulator illustrated in FIG. 2.

Turning to FIG. 3, the correspondence information memory 33 is loaded with the correspondence information as shown in a rectangular outline indicated by the reference numeral 33. It will be assumed that the predetermined number, namely, N is equal to ten. In FIG. 3, A, B, C, D, E, F, G, H, I, and J are shown in a leftmost column to indicate the first through the tenth pseudo-subscriber's telephone sets 11-1 to 11-10 which correspond to the first through the tenth line numbers, 0 to 9, and the first through the tenth telephone numbers, 82-1234, 82-1235, 82-1236, 82-1237, 82-1238, 82-1239, 82-1240, 82-1245, 82-1246, and 82-1247.

Turning to FIG. 4, the procedure program memory 32 is loaded with the control procedure programs as shown in a block outlined by dash-dot lines and indicated by the reference numeral 31. In the example being illustrated, the control procedure programs are equal in number to three and are called first through third control procedure programs 32-1, 32-2, and 32-3. The first control procedure program 32-1 is a control procedure program for a call forwarding service by using the first through the third pseudo-subscriber's telephone sets 11-1, 11-2, and 11-3 which are indicated by A, B, and C. The second control procedure program 32-2 is a control procedure program for a three-way calling service by using the fourth through the seventh pseudo-subscriber's telephone sets 11-4, 11-5, 11-6, and 11-7 which are indicated by D, E, F, and G. The third control procedure program 32-3 is a control procedure program for a call waiting service by using the eighth through the tenth pseudo-subscriber's telephone sets 11-8, 11-9, and 11-10 which are indicated by H, I, and J.

Figure 5:
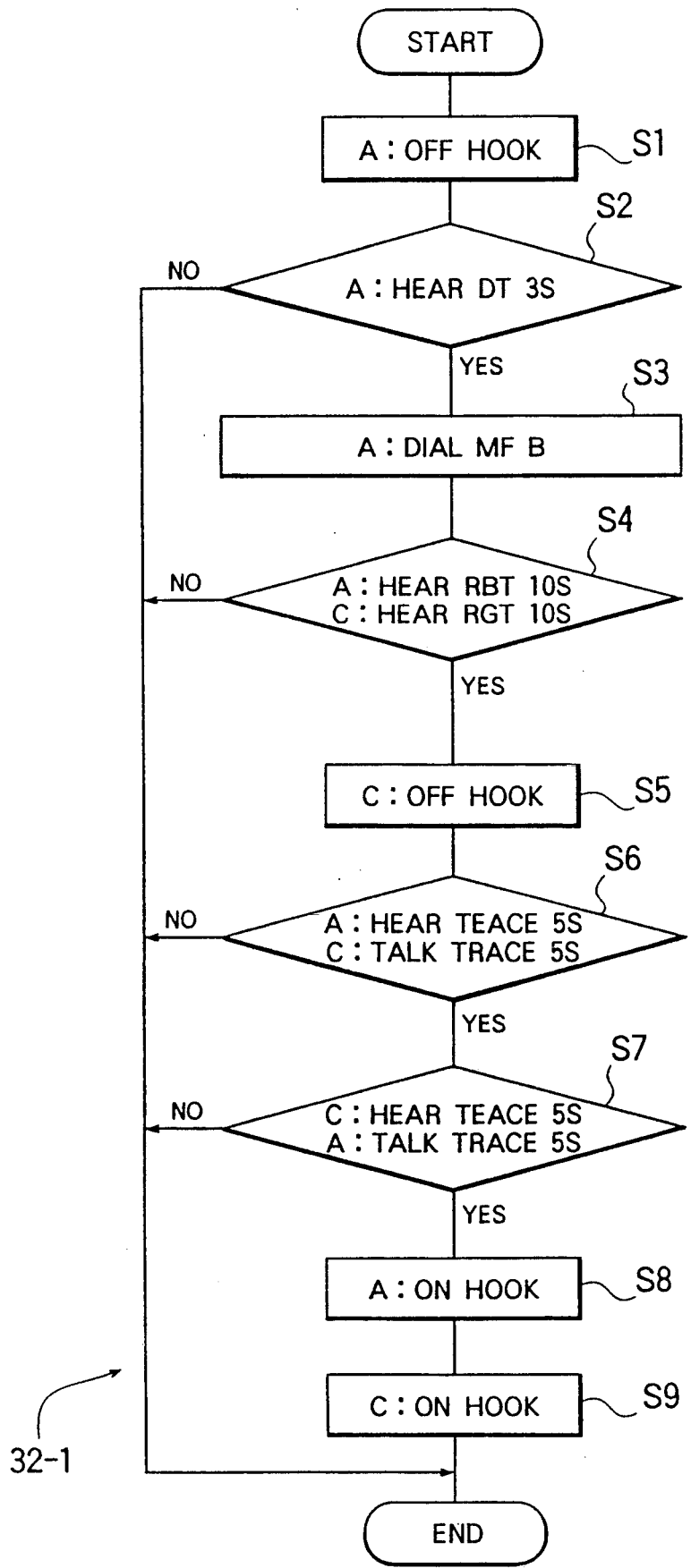
FIG. 5 is a flow chart for use in describing operation executed in accordance with a control procedure program for a call forwarding service that is one of the control procedure programs illustrated in FIG. 4.

Referring to FIG. 5, description will be made as regards operation executed in accordance with the first control procedure program 32-1 which the subscriber call simulator 10 carries out in cooperation with the telephone switching system 20. It will be presumed that the second pseudo-subscriber's telephone set 11-2 is provided with function of the call forwarding service. In the first control procedure program 32-1, the first pseudo-subscriber's telephone set A or 11-1 dials the second pseudo-subscriber's telephone set 11-2 which is indicated by B and which has the telephone number of 82-1235 to terminate the third pseudo-subscriber's telephone set 11-3. The first control procedure program 32-1 is described by predefined character codes as follows:

DT: a dial tone (a continuous tone having a frequency of 400 Hz),

RBT: a ringback tone (an intermittent tone which has a frequency of 600 Hz and continue an intermittent stop during four seconds), RGT: a ringing tone (an intermittent tone having a frequency of 20 Hz and continues two seconds with an intermittent stop during four seconds), and TRACE: a tracer tone (a continuous tone having a frequency of 800 Hz).

At a first step S1, the main control circuit 17 indicates call of the first pseudo-subscriber's telephone set 11-1 indicated by A. Thereupon, the first pseudo-subscriber's telephone set 11-1 is put in an off-hook condition. The first step S1 is followed by a second step S2.

At the second step S2, the main control circuit 17 indicates that the first pseudo-subscriber's telephone set 11-1 carries out a monitor operation of the dial tone by using the tone detection circuit 14 during three seconds. If the dial tone is detected by the tone detection circuit 14, the second step S2 proceeds to a third step S3. Otherwise, the operation comes to an end.

At the third step S3, the main control circuit 17 indicates that the first pseudo-subscriber's telephone set 11-1 sends a multifrequency signal having the telephone number of the second pseudo-subscriber's telephone set 11-2 by using the multifrequency signal generation circuit 16. The third step S3 is succeeded by a fourth step S4.

At the fourth step S4, the main control circuit 17 indicates that the first pseudo-subscriber's telephone set 11-1 carries out a monitor operation of the ringback tone by using the tone detection circuit 14 during ten seconds and the third pseudo-subscriber's telephone set C or 11-3 carries out a monitor operation of the ringing tone by using the ringing detection circuit 13 during ten seconds. If the ringback tone and the ringing tone are detected by the tone detection circuit 14 and the ringing detection circuit 13, the fourth step S4 is followed by a fifth step S5. Otherwise, the operation comes to the end.

At the fifth step S5, the main control circuit 17 indicates an answer of the third pseudo-subscriber's telephone set 11-3. Thereupon, the third pseudo-subscriber's telephone set 11-3 is put in an off-hook condition. The fifth step S5 proceeds to a sixth step S6.

At the sixth step S6, the main control circuit 17 indicates that the third pseudo-subscriber's telephone set 11-3 sends the tracer tone by using the multifrequency signal generation circuit 16 during five seconds. In the meantime, the first pseudo-subscriber's telephone set 11-1 carries out a monitor operation of the tracer tone by using the multifrequency signal detection circuit 15 during five seconds. If the tracer tone is detected by the multifrequency signal detection circuit 15, the sixth step S6 is succeeded by a seventh step S7. Otherwise, the operation comes to the end.

At the seventh step S7, the main control circuit 17 indicates that the first pseudo-subscriber's telephone set 11-1 sends the tracer tone by using the multifrequency signal generation circuit 16 during five seconds. Meanwhile, the third pseudo-subscriber's telephone set 11-3 carries out a monitor operation of the tracer tone by using the multifrequency signal detection circuit 15 during five seconds. If the tracer tone is detected by the multifrequency signal detection circuit 15, the seventh step S7 is followed by an eighth step S8. Otherwise, the operation comes to the end.

At the eighth step S8, the main control circuit 17 indicates disconnection of the first pseudo-subscriber's telephone set 11-1. Thereupon, the first pseudo-subscriber's telephone set 11-1 is put in an on-hook condition. The eighth step S8 proceeds to a ninth step S9.

At the ninth step S9, the main control circuit 17 indicates disconnection of the third pseudo-subscriber's telephone set 11-3. Thereupon, the third pseudo-subscriber's telephone set 11-3 is put in the on-hook condition. The ninth step S9 proceeds to the end.

Turning to FIG. 6, description will be made as regards a case where another telephone switching system should be tested instead of the telephone switching system 20. Under the circumstances, the first through the N-th pseudo-subscriber's telephone set 11-1 to 11-N are assigned with the first through the N-th telephone numbers which are different from those as shown in FIG. 3. Therefore, the input/output section 18 (FIG. 2) inputs new correspondence information alone. The new correspondence information is stored in the correspondence information memory 33 (FIG. 2) by the main control circuit 17 as shown in a rectangular block indicated by the reference numeral 33. What should be noted in this connection is that it is unnecessary to change the control procedure programs stored in the procedure program memory 32 (FIG. 2). In FIG. 6, for example, the first pseudo-subscriber's telephone set A or 11-1 corresponds to the first line number 0 and the first telephone number, namely, 461-3251.

While this invention has thus far been described in conjunction with only one preferred embodiment thereof, it will now readily be possible for those skilled in the art to develop various other embodiments of this invention. For example, the procedure program memory memorizes only one control procedure program.

What is claimed is:

1. A subscriber call simulator connected through subscriber lines to a telephone switching system, said subscriber call simulator acting as pseudo-subscriber's telephone sets, wherein the improvement comprises:

inputting means for inputting control procedure information for said pseudo-subscriber's telephone sets;

memorizing means connected to said inputting means for memorizing said control procedure information as stored information; and controlling means connected to said memorizing means and said pseudo-subscriber's telephone sets for controlling said pseudo-subscriber's telephone sets by using said stored information.

2. A subscriber call simulator connected to a telephone switching system through subscriber lines assigned with line numbers, said subscriber call simulator acting as pseudo-subscriber's telephone sets assigned with telephone numbers, wherein the improvement inputting means for inputting a control procedure program for said pseudo-subscriber's telephone sets and correspondence information which makes said pseudo-subscriber's telephone sets correspond to said line numbers and said telephone numbers;

procedure program memorizing means connected to said inputting means for memorizing said control procedure program;

correspondence information memorizing means connected to said inputting means for memorizing said correspondence information; and controlling means connected to said procedure program memorizing means, to said correspondence information memorizing means, and to said pseudo-subscriber's telephone sets for controlling said pseudo-subscriber's telephone sets by using the control procedure program and the correspondence information stored in said procedure program memorizing means and said correspondence information memorizing means.

3. A subscriber call simulator as claimed in claim 2, wherein said control procedure program is described by predefined character codes.

* * * * *